(12) United States Patent
Mohamed

(10) Patent No.: US 6,529,008 B1
(45) Date of Patent: *Mar. 4, 2003

(54) ELECTROMAGNETIC INDUCTION COIL SENSOR

(76) Inventor: Moustafa Abdel Kader Mohamed, 4167 Hollandia Crt., Prince George, British Columbia (CA), V2N 4KS ( * ) Notice: Subject to any disclaimer, the term of this patent is extended or adjusted under 35 U.S.C. 154(b) by 0 days.

This patent is subject to a terminal disclaimer.

(21) Appl. No.: 09/579,682

(22) Filed: May 26, 2000

Related U.S. Application Data

(63) Continuation of application No. 09/069,478, filed on Apr. 20, 1998, now Pat. No. 6,084,413.

(30) Foreign Application Priority Data

Apr. 27, 1998 (CA) .............................................. 2235879

(51) Int. Cl.$^7$ ............................ G01V 3/10; G01R 33/12
(52) U.S. Cl. ........................ 324/345; 324/201; 324/228; 324/239
(58) Field of Search .......................... 324/174, 207.15, 324/207.24–207.26, 228, 239, 201, 258, 345; 336/110

(56) References Cited

U.S. PATENT DOCUMENTS

| | | | |
|---|---|---|---|
| 2,547,407 A | | 4/1951 | Nelson ........................ 324/239 |
| 3,405,353 A | * | 10/1968 | Smith et al. ................. 324/229 |
| 3,645,293 A | * | 2/1972 | Pedersen .................... 137/861 |
| 4,045,738 A | | 8/1977 | Buzzell ........................ 324/174 |
| 4,050,066 A | * | 9/1977 | Yanagisawa et al. ........ 340/388 |
| 4,384,252 A | | 5/1983 | Kolter .......................... 324/239 |
| 4,546,649 A | | 10/1985 | Kantor .......................... 73/168 |
| 4,680,961 A | | 7/1987 | Grauman et al. .......... 73/170 R |
| 4,700,133 A | | 10/1987 | Day ............................. 324/208 |
| 4,866,371 A | | 9/1989 | De ......................... 324/58.5 R |
| 4,901,017 A | | 2/1990 | Zinke ........................... 324/249 |
| 4,906,925 A | | 3/1990 | Kiminkinen ................. 324/228 |
| 4,922,197 A | | 5/1990 | Juds et al. .............. 324/207.21 |
| 5,023,547 A | | 6/1991 | Pawlak et al. .............. 324/174 |
| 5,041,784 A | | 8/1991 | Griebeler ............... 324/207.21 |
| 5,160,886 A | | 11/1992 | Carlen .................... 324/207.16 |
| 5,187,723 A | | 2/1993 | Mueller-Stuercken .......... 377/6 |
| 5,278,496 A | | 1/1994 | Dickmeyer et al. ......... 324/174 |
| 5,327,089 A | | 7/1994 | Ouellette ..................... 324/345 |
| 5,426,363 A | | 6/1995 | Akagi et al. ................. 324/239 |
| 5,432,758 A | * | 7/1995 | Sone ........................... 367/175 |
| 5,467,323 A | * | 11/1995 | Sone ........................... 367/175 |
| 5,498,958 A | | 3/1996 | Tu et al. ................. 324/207.16 |
| 5,504,424 A | | 4/1996 | Graf et al. ................... 324/174 |
| 5,504,428 A | | 4/1996 | Johnson ...................... 324/243 |
| 5,510,708 A | | 4/1996 | Shirai et al. ................. 324/174 |
| 5,519,322 A | | 5/1996 | Pozzi et al. .................. 324/346 |
| 5,521,583 A | | 5/1996 | Frahm et al. ................ 340/551 |
| 5,525,904 A | | 6/1996 | Hanley et al. ............... 324/300 |
| 5,552,705 A | | 9/1996 | Keller .......................... 324/239 |
| 5,574,367 A | | 11/1996 | Logue .................... 324/207.26 |
| 5,606,254 A | | 2/1997 | Xie et al. ..................... 324/174 |

OTHER PUBLICATIONS

Solid State Physics, Second Edition, John Wiley & Sons, England, 1974, J.R. Hook and H.E. Hall, Chapter 7, Diamagnetism and Paramagnetism.

Physics for Scientists & Engineers, Fourth Edition, vol. 2, Saunders College Pulishing, 1982, Raymond A. Serway, Chapter 30, Sources of the Magnetic Field, p. 884, Chapter 31, Faraday's Law, pp. 905–910.

* cited by examiner

*Primary Examiner*—Edward Lefkowitz
*Assistant Examiner*—Reena Aurora
(74) *Attorney, Agent, or Firm*—Davis & Bujold, P.L.L.C.

(57) ABSTRACT

An electromagnetic induction coil includes a casing with high magnetic permeability with a magnet disposed within the casing. The magnet has a central hole. A core with high magnetic permeability is disposed within the central hole of the magnet. The core is in physical contact with the casing. A multi-loop coil of conductive wire is disposed within the central hole of the magnet encircling the core. The multi-loop coil is insulated from the magnet.

6 Claims, 3 Drawing Sheets

ELECTROMAGNETIC INDUCTION COIL SENSOR

This is a continuation of U.S. patent application Ser. No. 09/069,478 filed Apr. 20, 1998, now U.S. Pat. No. 6,084,413 issued Jul. 4, 2000.

FIELD OF THE INVENTION

The present invention relates to an electromagnetic induction coil sensor suitable for use in an apparatus for detecting rock movement and other sensing applications.

BACKGROUND OF THE INVENTION

In U.S. patent application Ser. No. 09/069,478 filed Apr. 29, 1998, now U.S. Pat. No. 6,084,413, there are described short comings in available apparatus for detecting rock movement. Scientists have been trying to perfect techniques for collecting data regarding rock movement, such as that which is caused by the flow of water in a river or stream (riverbed movement), which is necessary for a thorough study of erosion, flooding, sedimentation and the like. One technique that scientists have employed involves collecting rocks from the site under investigation and implanting a small magnet inside each rock. The rocks are then placed strategically upstream of their anticipated path of travel. After an event of flooding, the new positions of the rocks are traced by detecting the magnet field of the magnets inside each rock. The movement which the rocks have undergone can then be deduced from the changes in the positions of the rocks. One disadvantage of this method is that it is costly to collect rocks, implant a magnet in each rock, strategically place the rocks back at the site under investigation and detect the rocks having magnetic implants after the event. Another disadvantage of this method is that, in adding magnets to the rocks and placing the rocks back into the environment, there is a human intervention that can skew the data received.

Another technique that scientists use based upon the fact that a proportion of rocks at any site under investigation have a naturally occurring remnant magnetization that is strong enough to be detected by shock coils. The signal level which can be obtained using existing technology for detecting the remnant magnetization in a rock that is capable of being detected is approximately 10 microvolts. By working out a statistical average of the percentage of rocks at a site under investigation that are capable of being detected, rough estimates can be made as to the real number of rocks being moved. This method of detection of rock movement requires a considerable amount of study to arrive at a statistical average as to the percentage of rocks at the site under investigation having a remnant magnetism of sufficient strength to generate a signal of magnitude of 10 millivolts. It also requires the use of expensive amplifiers to condition the signals.

The above mentioned patent application then goes on to describe an alternative method and apparatus for detecting rock movement. This new approach is based upon changes in magnetic permeability in medium proximate to the coil as a result of rock movement in accordance with Faraday's law of electromagnetic induction.

Magnetic induction B is given by $B = \mu.H$ where $\mu$ is the magnetic permeability of a given medium and H is the applied magnetic field. The magnetic flux $\Phi$ through one loop of an electrical coil is given by $\Phi = B.A. \cos \theta$ where B is as defined above, A is the cross sectional area of the loop, and $\theta$ is the angle between the vector of B and the direction perpendicular to the plane of the loop. As the magnetic flux $\Phi$ changes with time t an electromotive force EMF is generated which is proportional to the product of the rate of change of the magnetic flux and the number of loops in the electrical coil N $EMF = -N.(d\Phi/dt)$.

With the alternative approach proposed, the rocks do not have to have any remnant magnetism, as what is being measured is magnetic susceptibility; the ability of the rock to be magnetized. This method of detecting rock movement based upon induced electromotive force due to the change of magnetic permeability has been found to be much more sensitive to rock movement than the previously described method that relied upon detection of rocks with remnant magnetism. The method detects changes in the magnetic permeability of the medium proximate to the sensor as an object passes close to the sensor. The method is capable of generating signals which are typically between 3 and 10 millivolts as a rock passes by the sensor; which is about 1000 times greater than the signals generated by detecting remnant magnetism.

A key component of the apparatus for detecting rock movement is an electromagnetic induction coil sensor. This electromagnetic induction coil sensor can be used in other applications, not related to rock detection. Such a sensor can be used to detect changes in magnetic permeability due to cracks, metal fatigue in a material or structure. It can be used to monitor traffic on highways or railways. It can be used to detect movement and speed of movement of conveyors. It can be used to detect movement as part of a security system. It can be used to detect non-uniform distributions of elements in a given alloy or mixture. It can be used to detect movements of moving parts in any machine.

During the prosecution of the parent application, the closest prior art disclosed in a search by the United States Patent and Trade Mark Office was U.S. Pat. No. 4,384,252 which issued to Kolter. The Kolter reference discloses an iron casing, a rod like permanent magnet which serves as a central magnetic core, and electrically conductive wire wound around a bobbin which encircles the permanent magnet.

The effectiveness of an electromagnetic induction coil sensor is dependent upon the strength and uniformity of the magnetic field at the central magnetic core. The Kolter reference is viewed as having inherent limitations upon the strength and uniformity of the magnetic field at the central magnetic core. With the electromagnetic induction coil of Kolter a permanent magnet is used at the central magnetic core. A permanent magnet has field lines that extend outwardly from the magnet like branches on a tree. This magnetic field of a permanent magnet is strongest at its poles and becomes progressively weaker until in the middle the positive and negative magnetic field cancel each other out. This results in the sensitivity of the sensor being reduced at the midpoint of the magnet.

SUMMARY OF THE INVENTION

What is required is a electromagnetic induction coil sensor that has a stronger and more uniform magnetic field.

According to the present invention there is provided an electromagnetic induction coil sensor which includes a casing with high magnetic permeability with a magnet disposed within the casing. The magnet has a central hole. A core with high magnetic permeability is disposed within the central hole of the magnet. The core is in physical contact with the casing. A multi-loop coil of conductive wire is disposed within the central hole of the magnet encircling the core. The multi-loop coil is insulated from the magnet.

The electromagnetic induction coil sensor, as described above, has a stronger and more uniform central magnetic core than Kolter's. The magnetic field lines tend to become concentrated in the central hole of the magnet. There is a difference between the strength of the magnetic field in the middle as compared to ends. Instead of being weaker in the middle, the magnetic field is stronger in the middle. This increase in the magnetic field in the middle depends upon the hole diameter, but is roughly a two fold increase. In order to increase sensitivity of a electromagnetic induction coil sensor, one reduces the size of the core. Kolter has less flexibility when making such an adjustment, for he uses a permanent magnet as his core. When Kolter reduces the cross-sectional area of his core, he is also reducing the amount of material in his magnet. This serves to reduce magnetic field strength and can reduce, rather than increase, sensitivity.

Although beneficial results may be obtained through the use of the electromagnetic induction coil sensor, as described above, the electromagnetic induction coil sensor is often required in environments that require resistance to vibration or exposure to the elements. Even more beneficial results may, therefore, be obtained when the core, the multi-loop coil and the magnet are secured within the casing by adhesive. The adhesive prevents relative movement of the components within the casing. Where the electromagnetic induction coil sensor is going to be exposed to water, the adhesive should be water proof. Beneficial results have been obtained through the use of epoxy. The use of adhesive enables the multi-loop coil to be insulated from the magnet by a insulating gap.

Although beneficial results may be obtained through the use of the electromagnetic induction coil sensor, as described above, the pattern of field lines is a function of the distance between the core of the sensor and the outer edge of the casing. Even more beneficial results may, therefore, be obtained when the casing has an outwardly projecting lip. This outwardly projecting lip increases the distance to the outer edge of the casing and changes the height of the field lines.

BRIEF DESCRIPTION OF THE DRAWINGS

These and other features of the invention will become more apparent from the following description in which reference is made to the appended drawings, wherein.

DETAILED DESCRIPTION OF THE PREFERRED EMBODIMENT

Figure 1:
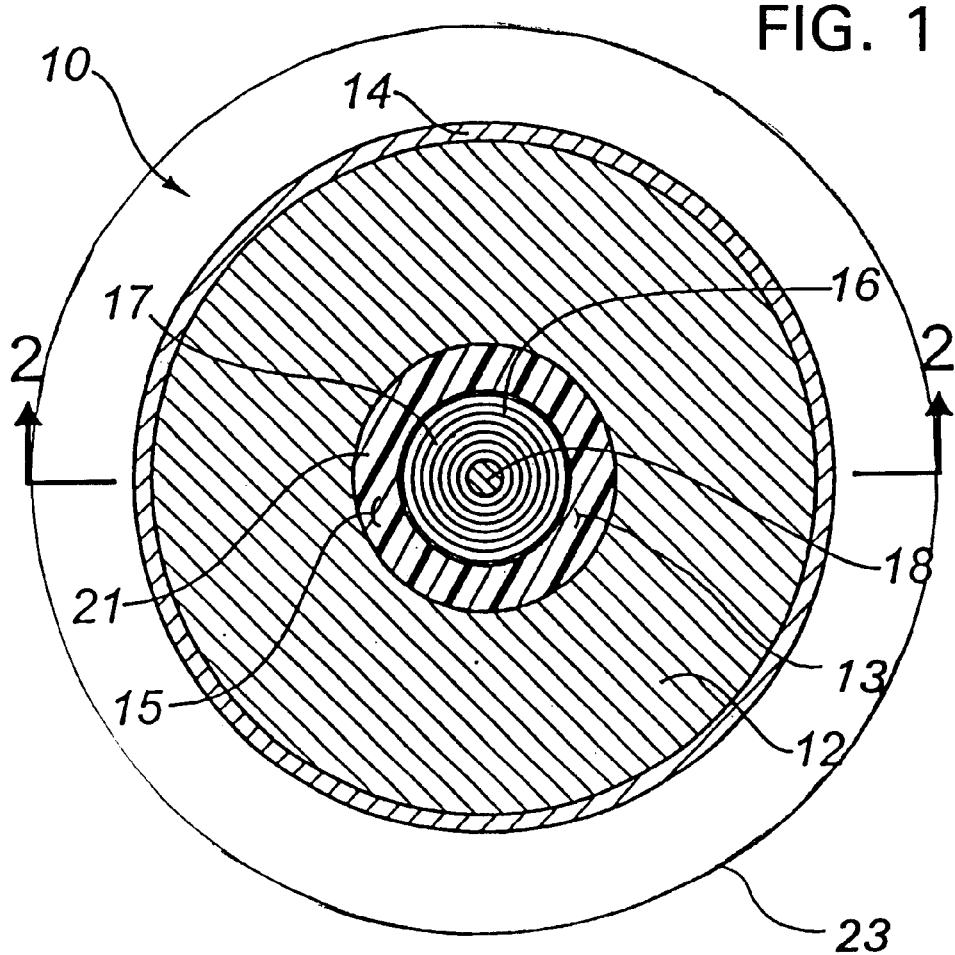
FIG. 1 is a top plan view, in section, of an electromagnetic induction coil sensor constructed in accordance with the teachings of the present invention.

The preferred embodiment, an apparatus for detecting rock movement generally identified by reference numeral 100, will now be described with reference to FIGS. 1 through 4.

With reference to FIG. 1, an electromagnetic induction coil sensor 10 for use in apparatus 100 is constructed of the following components which are assembled in a coaxial configuration. A strong, circular, permanent magnet 12 is fitted within a casing 14 composed of soft iron. Magnet 12 has a circular hole 15 positioned at its centre, assuming an annular configuration. In a typical construction, magnet 12 will be approximately 7.5 cm in outer diameter and approximately 1.25 cm deep, with hole 15 approximately 2.5 cm in diameter in the centre. The magnetic field strength of magnetic 12 is approximately 2 kiloGauss at the centre of hole 15.

Coil 16 is placed coaxially within hole 15 in magnet 12. The dimensions of coil 16 will be slightly less than 2.5 cm outer diameter, 0.3 cm inner diameter, and 1.25 cm deep; with an insulating gap 13 so as to avoid direct contact between coil 16 and magnet 12. The electrical resistance of such a coil will be approximately 500 ohms and the inductance will be approximately 220 milliHenry. Coil 16 has a plurality of loops 17.

A soft iron core 18 is fitted coaxially within the entire depth of coil 16 and touching the inside surface of the soft iron casing 14 in which the assembly is contained. Iron core 18 is used to increase the magnetic flux at the centre of coil 16, compared to the same assembly with air instead of iron core 18 at the centre of coil 16. It has been found that the presence of iron core 18 increases the magnetic flux at the centre of coil 16 by a three or four fold compared to the magnetic flux at the centre of coil 16 for an otherwise identical assembly in which there is no iron core within the coil. Iron casing 14 also serves to enhance the magnetic flux. The use of soft iron for the construction of casing 14 was found to increase the magnetic flux at the core by approximately two fold when compared with the magnetic flux for sensor 10 contained within a non-magnetic material. The casing also shields and protects the enclosed components of sensor 10.

It will be obvious to one skilled in the art that the dimensions or proportions of sensor 10 and of each component therein can be varied to change the electromagnetic properties of sensor 10. The principals of operation are not changed by varying the dimensions.

Figure 2:
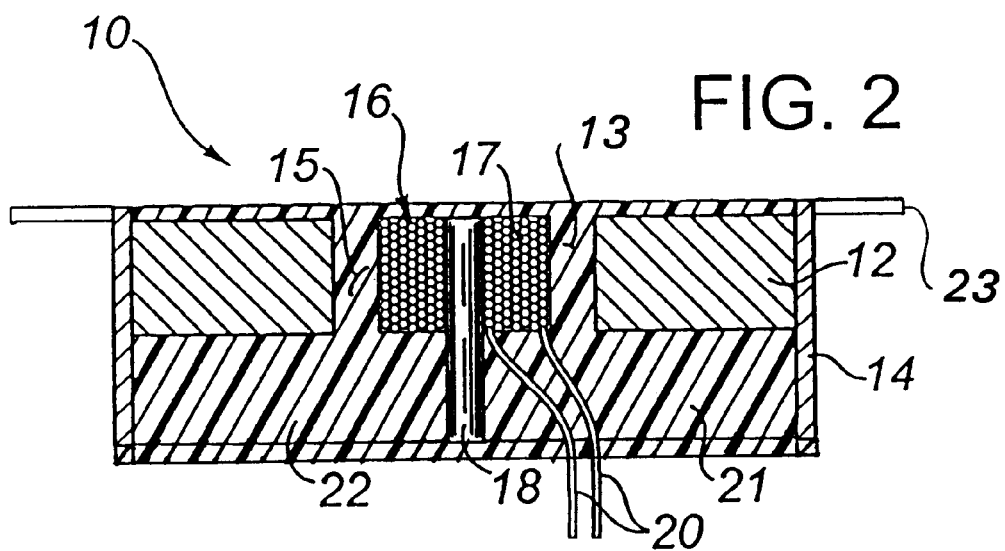
FIG. 2 is a side elevation view, in section, of the electromagnetic induction coil sensor illustrated in FIG. 1.

With reference to FIG. 2, a side view of the assembled magnet 12, soft iron casing 14, coil 16, and soft iron core 18 is shown. Electrical leads 20 are connected to coil 16 and pass through casing 14 to be connected to a data logger or other recording device. The remaining space within the assembly is filled with an epoxy or similar non-magnetic and non-conducting waterproof resin, generally indicated by reference numeral 21. Resin 21 prevents motion of the components within the assembly relative to each other. It is a matter of importance to prevent the motion of the components of the assembly relative to each other. Motion such as that caused by mechanical vibrations can create electromagnetic noise or spurious signals which would adversely affect the detection limits and accuracy of sensor 10 and thereby reduce the quality of the data being collected. Resin 21 also provides the necessary water seal and protection of the components from damage by humidity, water, or impingement by rocks or small particles of solid matter.

Casing 14 has an outwardly projecting lip 23. By selection of the size of outwardly projecting lip 23, the height of field lines for sensor 10 may be adjusted.

Figure 3:
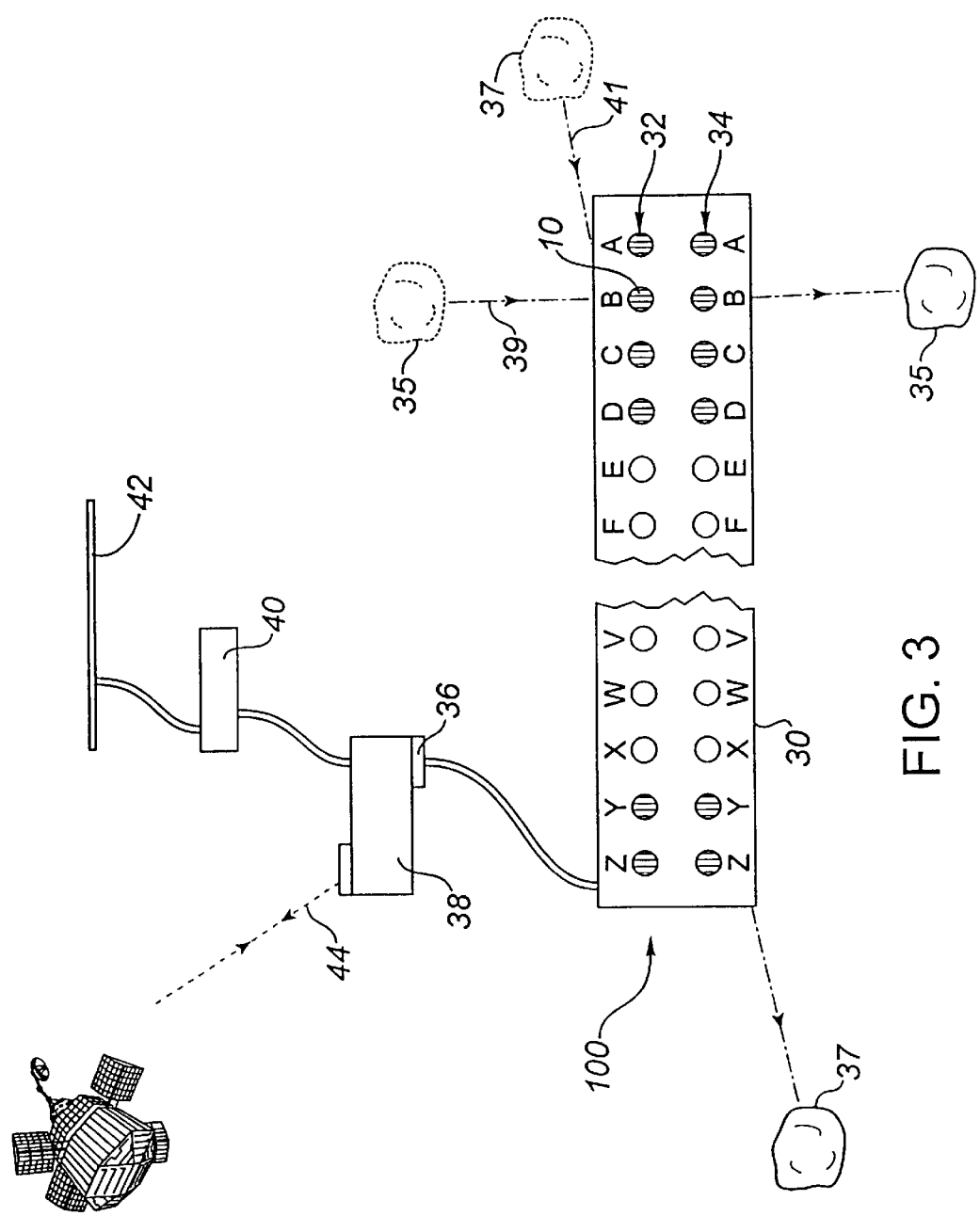
FIG. 3 is a block diagram of an apparatus for detecting rock movement constructed in accordance with the teachings of the present invention.

With reference to FIG. 3, a block diagram is shown for one of the possible embodiments of apparatus 100. A plurality sensors 10 and are shown mounted on a support 30 in rows 32 and 34. Each of rows 32 and 34 has sensors 10 a through z. Referring to FIG. 1, each of sensors 10 will be as described above, and will include core 18, coil 16 with a number of loops 17 encircling core 18. Referring to FIG. 3, the length and width of support 30, and consequently the length of rows 32 and 34 will be determined by the width of the flow path at the location at which the array will be used. Support 30 to which sensors 10 are mounted, is constructed from non-magnetic materials. There is consistent spacing between sensors a through z in each of rows 32 and 34. The distance between rows 32 and rows 34 and between sensors a through z within the rows is selected to be larger than the distance which a rock (35 or 37) is expected to be capable of travelling in the interval between measurements. If the expected speed of flow of the water which will cause the rock to move is designated V and the time interval between measurements is designated by dt, then the distance between each of rows 32 and each of rows 34 will be a multiple of the product of V and dt. The value of dt will be determined by the scanning time constant of the signal detection and recording system. The distance between sensors 10 between rows 32 and 34 and between sensors a through z within the rows is selected to allow the collection of sufficient data from across the site under investigation.

Figure 5:
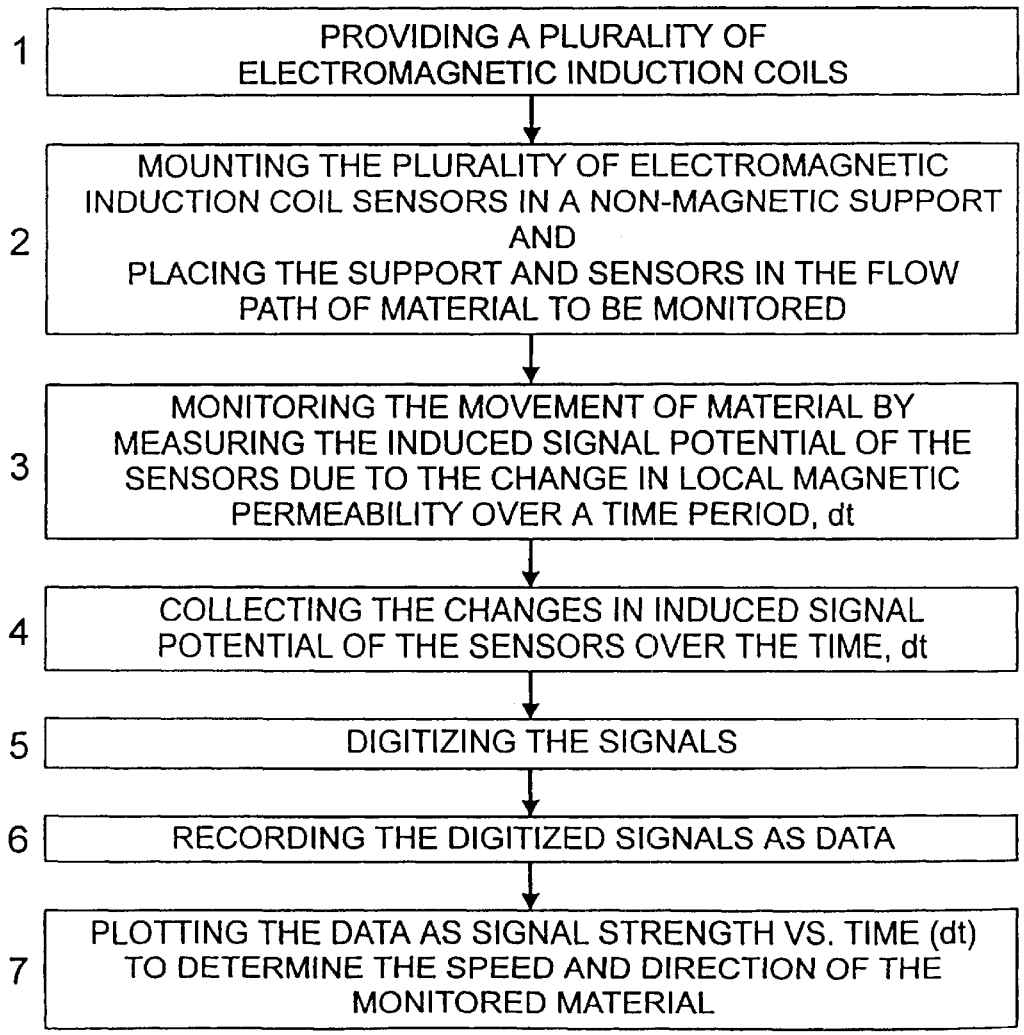
FIG. 5 is a block diagram of the method used in detecting and analyzing rock movement.

Referring to FIGS. 3 and 5, the signals from each sensor 10 will be collected 4 using a data logger 38 coupled to the plurality of electromagnetic induction coil sensors 10. Data logger 38 has processing capabilities and serves as a microprocessor including means for monitoring changes in electromotive force of the electromagnetic induction coil sensors 10 and means for measuring a time interval over which those changes occur. The signals from each sensor 10 are collected through a multiplexer and digitized 5 using an analog to digital converter 36. The digitized signals and the time at which each signal was received will be recorded 6 to data logger 38. The data acquisition, conversion and recording system will be electrically powered. The electrical power may be supplied from an external source or may be supplied from a dedicated source such as a rechargeable battery 40 which can be recharged using a solar panel 42 or other means. The signals may be transmitted to a remote location using a transmission device such as a cellular telephone link 44.

Figure 4:
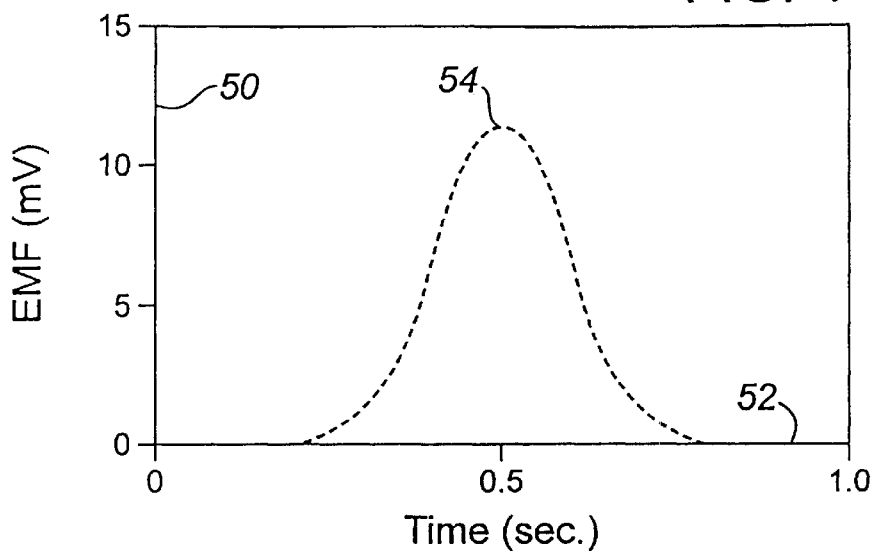
FIG. 4 is a graphic representation as to how rock movement can be detected with an electromagnetic induction coil by detecting changes in magnetic permeability as a rock approaches and then moves away from the apparatus.

With reference to FIG. 4, as a rock approaches a sensor the magnetic permeability of the medium proximate to the sensor changes. The change in the magnetic permeability is detected as an induced potential 50. As the rock then moves away from the sensor the signal decreases in magnitude. The signal from the detector changes with time 52. The maximum value for the signal 54 shows at what time the rock was closest to the sensor.

The use and operation of apparatus 100 will now be described with reference to the preferred method and with reference to FIGS. 1 through 5. Referring to FIGS. 1 and 5, the first step 1 of the method involves providing a plurality of electromagnetic induction coils, as described above, for use as sensors 10. Referring to FIG. 3, the second step 2 involves mounting the plurality of electromagnetic induction coil sensors 10 in a first rows 32 containing sensors a through z and a second row 34 containing sensors a through z to a non-magnetic support 30. Referring to FIG. 4, the third step 3 involves monitoring changes in induced electromotive force. Referring to FIG. 3 as either of rocks 35 or 37 approach support 30 the magnetic permeability of the medium proximate to sensors a through z in first row 32 and sensors a through z in second row 34 changes. Referring to FIG. 4, the change in the magnetic permeability is detected as an induced potential. The signal from the detector changes with time as rocks 35 and 37 moves toward, past and then away from the sensor. As the rock moves toward the sensor the signal increases, reaches a maximum value as the rock passes the sensor, and then decreases in magnitude as the rock moves away from the sensor. The maximum value for the signal shows at what time the rock was closest to the sensor. Referring to FIG. 3, the speed of movement of the rock can be calculated using data from the sensors 10 in rows 32 and 34 by detecting a change in induced electromotive force in the electromagnetic induction coils over a measured time interval. The signals 7 detected from each sensor are measured in real time. The time at which rocks 35 or 37 is closest to sensors a through z in first row 32 is recorded. The subsequent movement of rocks 35 or 37 will then cause them to travel away from first row 32 of sensors a through z toward second row 34 of sensors a through z. The time at which rocks 35 or 37 is closest to second row 34 of sensors a through z is recorded. Rock 35 is moving at right angles to support 30 along a path indicated by reference numeral 39, which will result in rock 35 moving directly over sensor b in first row 32 and then sensor b in second row 34. The time it took rock 35 to move from sensor b in first row 32 to sensor b in second row 34 can then be calculated. The distance between rows 32 and 34 is known. From the distance between rows of sensors 32 and 34 and the time taken by rock 35 to travel from one to the other the speed of movement of the rock can be calculated. Rock 37, on the other hand is going on an angular path, generally indicated by reference numeral 41, which will take rock 37 in close proximity with numerous sensors starting with sensors a and b in first row 32 and ending with sensors y and z in second row 34. The speed and direction of rock 37 can be determined by plotting the signals for the various sensors along path 41.

The strength of the signal recorded from a sensor 10 is proportional to the change in magnetic permeability in accordance with Faraday's law of electromagnetic induction. The detected signal strength and shape depend upon all of the following factors: the speed, the angle of approach, the distance from the sensor and the internal composition of a given rock. Due to the random nature of all of these factors, each rock will have its own signature signal. This helps in keeping track of a given rock to calculate its speed.

It will be apparent to one skilled in the art that modifications may be made to the illustrated embodiment without departing from the spirit and scope of the invention as hereinafter defined in the Claims.

The embodiments of the invention in which an exclusive property or privilege is claimed are defined as follows:

1. An electromagnetic induction coil sensor, comprising:
    a casing with high magnetic permeability;
    a magnet disposed within the casing, the magnet having a central hole;
    a core with high magnetic permeability disposed within the central hole of the magnet, the core being in physical contact with the casing;
    a multi-loop coil of conductive wire disposed within the central hole of the magnet encircling the core, the multi-loop coil having impedance of at least approximately 500 ohms in order to make the multi-loop coil highly sensitive to external magnetic fields, the multi-loop coil being insulated from the magnet, and having connection leads, whereby connection is made to a conductive circuit; and
    remaining space within the casing being filled with a non-conducting resin, thereby securing the core, the multi-loop coil and the magnet against relative movement within the casing.

2. The electromagnetic induction coil sensor as defined in claim 1, wherein the resin is water proof.

3. The electromagnetic induction coil sensor as defined in claim 1, wherein the resin is an epoxy.

4. The electromagnetic induction coil sensor as defined in claim 1, wherein the multi-loop coil is insulated from the magnet by an insulating gap.

5. The electromagnetic induction coil sensor as defined in claim 1, wherein the casing has an outwardly projecting lip.

6. An electromagnetic induction coil sensor, comprising:

an iron casing with an outwardly projecting lip;

an annular magnet disposed within the iron casing, the annular magnet having a central hole;

a soft iron core disposed within the central hole of the annular magnet, the soft iron core being in physical contact with the iron casing;

a multi-loop coil of conductive wire disposed within the central hole of the annular magnet encircling the soft iron core, the multi-loop coil having impedance of at least approximately 500 ohms in order to make the multi-loop coil highly sensitive to external magnetic fields, the multi-loop coil having connection leads, whereby connection is made to a conductive circuit;

an insulating gap being provided between the multi-loop coil and the annular magnet; and the soft iron core, the multi-loop coil and the annular magnet being set in epoxy which fills remaining space within the iron casing.

* * * * *